United States Patent [19]

Lohrbach et al.

[11] Patent Number: 5,371,492

[45] Date of Patent: Dec. 6, 1994

[54] METHOD AND APPARATUS FOR AUTOMATICALLY EXECUTING SYSTEM RECONFIGURATIONS

[75] Inventors: Jeffrey G. Lohrbach, Elgin; Gregory A. Dertz, Lake in the Hills; Michael S. Densmoor, Wheeling; Armando Vera, Mount Prospect; Paul Wiederholt, Arlington Heights; Scott M. Mottonen, Streamwood; Timothy L. Mc Vey, Fox River Grove, all of Ill.

[73] Assignee: Motorola, Inc., Schaumburg, Ill.

[21] Appl. No.: 71,026

[22] Filed: Jun. 3, 1993

Related U.S. Application Data

[63] Continuation of Ser. No. 489,130, Mar. 5, 1990, abandoned, which is a continuation-in-part of Ser. No. 458,912, Dec. 29, 1989, abandoned.

[51] Int. Cl.⁵ .............................................. H04Q 1/00
[52] U.S. Cl. ........................ 340/825.03; 340/825.06; 340/825.47; 340/825.52; 455/53.1
[58] Field of Search ................ 340/825.03, 825.06, 340/825.44, 825.47, 825.52; 455/17, 10, 11.1.53.1, 54.1; 379/58, 62, 63

[56] References Cited

U.S. PATENT DOCUMENTS

| | | | |
|---|---|---|---|
| 4,646,345 | 2/1987 | Zdunek et al. | 379/58 |
| 4,723,264 | 2/1988 | Sasuta et al. | 379/63 |
| 4,817,190 | 3/1989 | Comroe et al. | 455/17 |
| 4,831,373 | 5/1989 | Hess | 455/17 |
| 4,901,314 | 2/1990 | Lohrbach | 455/17 |

Primary Examiner—Donald J. Yusko
Assistant Examiner—Brian Zimmerman
Attorney, Agent, or Firm—Timothy W. Markison

[57] ABSTRACT

In a communication system having a communication resource allocator, a plurality of communication units, a plurality of communication resources, and at least one console, the communication resource allocator is improved to comprise system reconfiguration databases, selection information, execution information, and predetermined event receiving information. The improvement allows the communication system to be automatically reconfigured in response to a predetermined event. The predetermined event is typically initiated by one of the plurality of communication units.

4 Claims, 3 Drawing Sheets

| TABLE 1 | | CALL PATCH ASSIGNMENTS | | | |
|---|---|---|---|---|---|
| | | COM. RES. 1 | COM. RES. 2 | COM. RES. 3 | COM. RES. N |
| COM. RES. THAT INITIATED THE CALL PATCH | COM. RES. 1 | X | X | | X |
| | COM. RES. 2 | | X | X | |
| | COM. RES. 3 | | | X | X |
| | COM. RES. N | | X | X | X |

METHOD AND APPARATUS FOR AUTOMATICALLY EXECUTING SYSTEM RECONFIGURATIONS

This is a continuation of application Ser. No. 07/489,130, filed Mar. 5, 1990, now abandoned, which is a continuation-in-part of Ser. No. 07/458,912, filed Dec. 29, 1989, now abandoned.

TECHNICAL FIELD

This invention relates generally to communication systems and in particular to automatic execution of system reconfigurations in response to predetermined events.

BACKGROUND OF THE INVENTION

A typical communication system, such as a trunked or conventional communication system, comprises a communication resource allocator, a plurality of communication resources, a plurality of consoles, and a plurality of communication units. Generally, the plurality of communication units, which may be mobile vehicle units or portable personal units, are arranged into related groups. For example, communication units operated by a city's police force may form one group, while communication units operated by the city's fire department, dog catcher units, highway crews, and civil engineers may form other groups. The groups may be further divided into sub groups, for example, the police group may be divided by districts such as police 1, police 2, etc. (For trunked communication systems, groups of communication units are arranged into fleets and/or sub fleets; for conventional communication systems, groups of communication units are affiliated with at least one particular communication resource.)

The plurality of consoles, which may be devices as defined in Motorola Inc. publication No. R4-2-37C, March 1988, entitled System Planner, perform supervisory functions for assigned groups and/or subgroups. Typically, each console performs supervisory functions such as resetting emergency conditions, manually reconfiguring the system, and transmitting at a priority level. Resetting emergency conditions consists of answering an emergency call, resetting audio and/or visual emergency call indicators and deactivating the manual system reconfiguration.

For example, if an emergency condition arises on a particular console, the operator of the console, upon receiving an emergency indication, would determine which group initiated the emergency. After determining which group initiated the emergency, the operator manually reconfigures the communication system. The system reconfiguration may comprise manually patching two or more groups together, where the groups to be patched together are determined by the operator based on the group initiating the emergency. (Call patching may be defined as a process for allowing two or more groups that normally do not communicate with each other to do so.) A difficulty arises if a group that is not presently monitored by the console is to be part of the call patch. Under such conditions, the operator must assign the required group before activating the call patch. Typically, the operator must deassign a group that he is presently monitoring such that he can add the group that is to be part of the call patch.

Generally, several seconds (about 5 to 15 seconds) are required to perform a manual call patch. Additional time may be spent if a human error occurs as a result of an improperly executed call patch. In several emergency situations, the first few seconds are critical and may be the difference between life and death. Therefore, a need exists for a communication system that performs system reconfigurations automatically such that execution time is reduced, potential for human error is reduced, and previous system limitaions are overcome.

SUMMARY OF THE INVENTION

These needs and others are substantially met by the method and apparatus for automatically executing system reconfigurations disclosed herein. In a communication system having a plurality of repeaters that transceive information on a plurality of communication resources, a plurality of communication units, a communication resource allocator, and at least one console, the communication system may be automatically reconfigured upon initiation of a predetermined event. Once a predetermined event has been initiated, a predetermined communication system reconfiguration is selected based upon the predetermined event and automatically executed without intervention from an operator of the console.

In an aspect of the present invention, a plurality of communication system reconfigurations may be reprogrammed for each predetermined event by a console management terminal (CMT) or a computer aided dispatcher (CAD) device. Upon a reassignment condition, the CMT, or CAD, may reprogram a system reconfiguration database that contains the communication system reconfiguration, or configurations, for each of the predetermined events. The system reconfiguration database may be a reprogrammable memory device and is typically contained within the communication resource allocator.

In another aspect of the present invention, a communication unit of the plurality of communication units may initiate the predetermined event. The communication unit may be affiliated with any group, or subgroup, where the predetermined event may be an emergency call. Based on the communication unit's group, or subgroup, the communication system is automatically reconfigured without intervention from an operator of the console. Further, the system reconfiguration may be automatically executed independently of whether a group of the call patch is being monitored by the console. Unmonitored, or unpresented groups are described in U.S. Pat. No. 4,995,095 entitled A Method and Apparatus for Utilizing Unpresented Communication Groups.

Table 1 illustrates a few possible call patch assignments that may be automatically executed in accordance with the present invention.

BEST MODE FOR CARRYING OUT THE INVENTION

Figure 1:
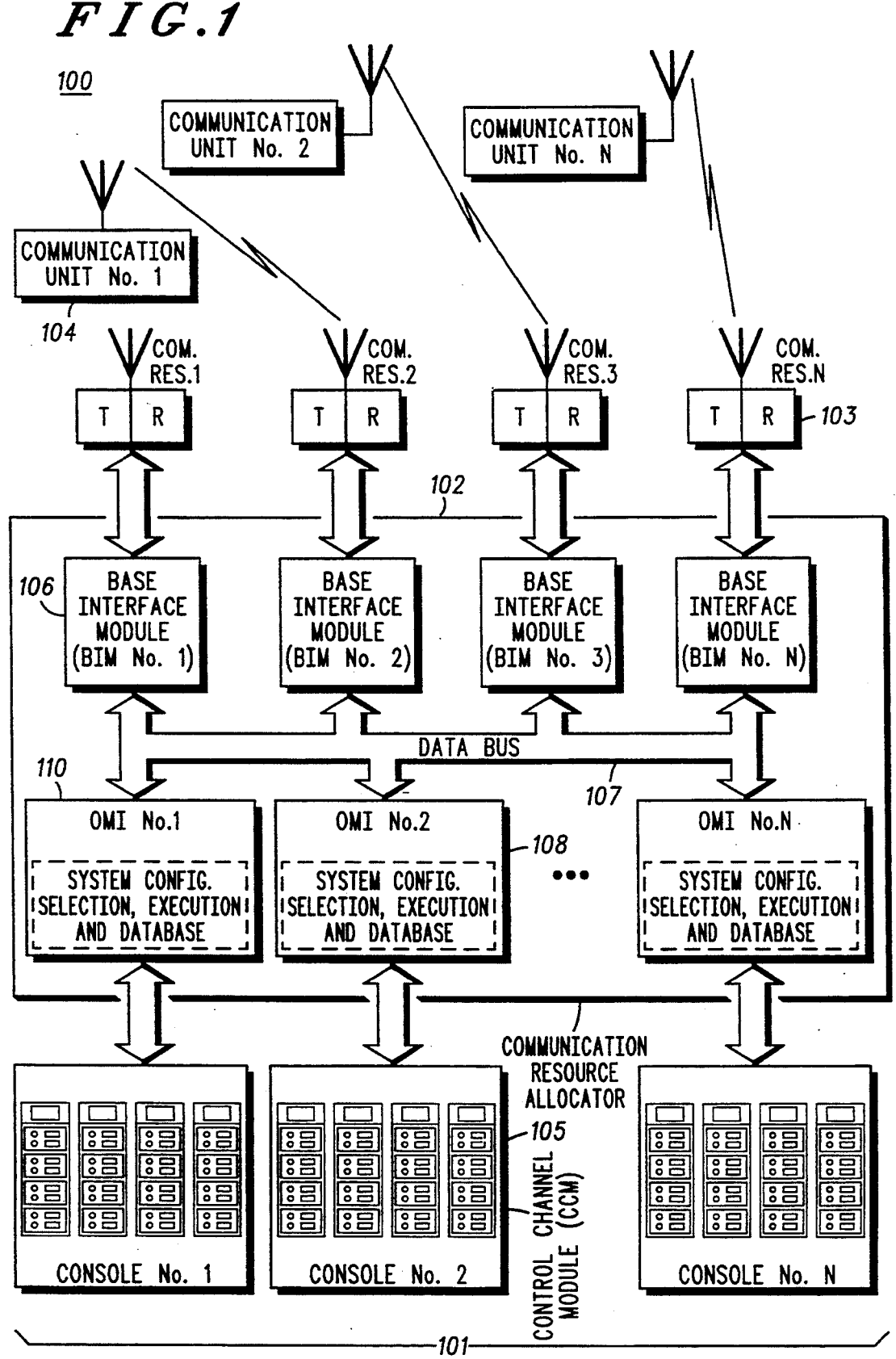
FIG. 1 illustrates a conventional communication system that incorporates the present invention.

FIG 1. illustrates a conventional communication system that incorporates the present invention. The communication system (100) comprises a plurality of consoles (101) (three shown), a communication resource allocator (102), a plurality of repeaters that transceive information on a plurality of communication resources (103) (four shown), and a plurality of communication units (104) (three shown). Each of the plurality of consoles (101) comprises a plurality of control channel modules (CCM) (105). Each of the CCMs (105) monitors a particular communication resource and enables an operator to manually supervise the particular communication resource. The communication resource allocator (102) comprises a plurality of base interface modules (BIM) (106) (four shown), a plurality of operator MUX interfaces (OMI) (108) (three shown), and a data bus (107). Each of the OMIs (108) comprises a microprocessor and/or a programmable memory device (110), such as a programmable read only memory device (PROM) that at least contains system reconfiguration selection instructions, execution instructions, predetermined event receiving instructions, and database information.

The present invention enables any predetermined communication system reconfiguration that is stored in a system reconfiguration database to be automatically executed without intervention from an operator of a console. Upon initiation of a predetermined event by any of the plurality of subscriber units, or an operator of a console, a system reconfiguration database is addressed based on the subscriber unit's group, or subgroup. (Each group, or subgroup, may have at least a portion of a system reconfiguration database assigned to it for storing communication system reconfigurations based on predetermined events initiated by any member of that group.) A predetermined communication system reconfiguration is selected from the system reconfiguration database and automatically executed by the communication resource allocator (102), via the PROM (108). The automatic execution of a system reconfiguration is executed faster (typically less than 2 seconds) and more accurately than when manually executed. The predetermined event may be an emergency call, other designated transmissions by a subscriber unit (104), or any other event desired by a user.

Figure 2:
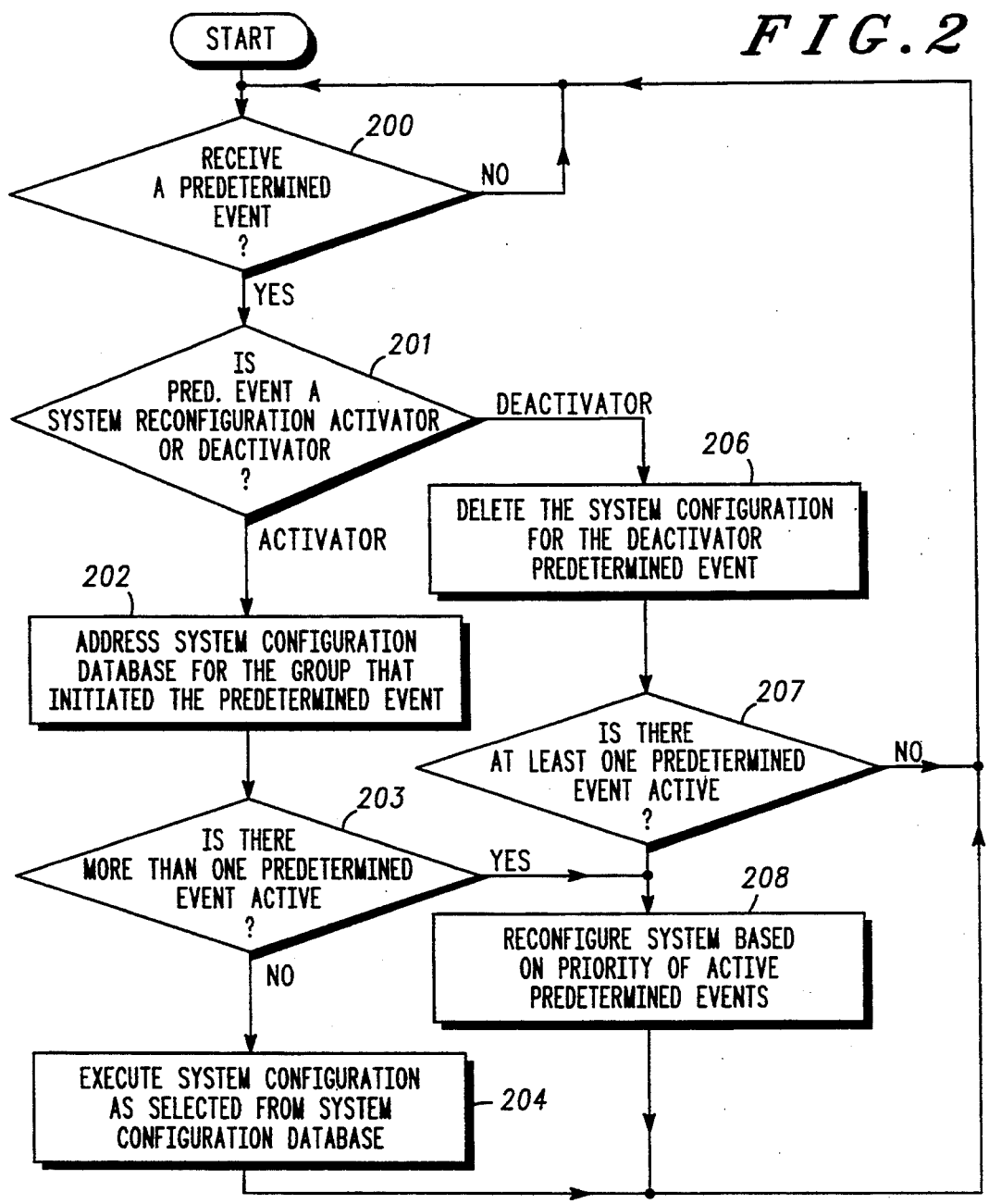
FIG. 2 illustrates one possible logic flow diagram of the present invention.

FIG. 2 illustrates one possible logic diagram of the present invention that a communication system (100) may perform with negligible affects on other operations. Upon starting the logic diagram, the communication resource allocator (102) determines whether it has received a predetermined event (200). If it has not received a predetermined event and no other predetermined events are active (201), the communication resource allocator (102) awaits to receive a predetermined event. Once the communication resource allocator (102) receives a predetermined event (200), it addresses a system reconfiguration database for the group that initiated the predetermined event (202). If there are no other predetermined events active (203), the communication resource allocator (102) executes the system reconfiguration selected from the system reconfiguration database in step 202 (204).

If a predetermined event had been active (201), the communication resource allocator (102) determines whether a predetermined event has ended (205). If a predetermined event has not ended (205), the communication resource allocator (102) awaits to receive another predetermined event (200) or for an active predetermined event to ended (205). If a predetermined event ends (205), the communication resource allocator (102) deletes the system reconfiguration for the predetermined event that has ended (206). After deleted the system reconfiguration (206), the communication resource allocator (102) determines whether there is at least one predetermined event still active (207). If no predetermined events are active (207), the communication resource allocator (102) awaits to receive a predetermined event (200). If there is at least one predetermined event active (207), the system (100) is reconfigured based on a priority of the active predetermined events (208). (Priority of executing the system reconfigurations will be discussed below.)

While at least one predetermined event is active (201), another predetermined event is received (200), the communication resource allocator (102) addresses the system reconfiguration database for the group that initiated the predetermined event of step 200 (202). With more than one predetermined event active (203), the system (100) is reconfigured based on priority of active predetermined events (208). As long as the flow diagram of FIG. 2 is active, the communication resource allocator (102) will constantly respond to predetermined events that are initiated by any of the plurality of communication units (104).

As an illustrative example, system reconfigurations in response to emergency calls will be discussed with reference to FIG. 1 and Table 1. Assume that console #1 of the plurality of consoles (101) is assigned to monitor and supervise communication resource #1 and that OMI #1 contains the system reconfiguration database for communication resource #1. When an emergency call is initiated by a communication unit affiliated to communication resource #1, the system reconfiguration database is addressed per the predetermined event. For an emergency call, the database may indicate that the communication system should be reconfigured such that communication resources #2 and #n are patched to communication resource #1 (see table 1). By patching communication resource #1, #2, and #n together, all communication units affiliated with these communication resources may communicate with each other. The patching of communication resources (103) together (call patching) may be based on geographic relationship of the communication resources (103) or based on functionality of the groups, such as police districts. The entire call patching occurs without intervention from the operator of console #1, however, the operator may receive indications of the emergency. If desired, the system manager operating the CAD may add other communication resources to the call patch, but he may not deleted any portion of the automatic call patch.

An alternative call patching process may be implemented such that when an emergency call is received, predetermined groups may be patched to a communication resource that is reserved for emergencies only. Thus, when an emergency call is initiated on communication resource #1 by any affiliated communication unit, the groups affiliated with communication resources #1, #2, and #n would be patched to the emergency communication resource. As mentioned above, the operator may or may not be alerted of the emergency.

When the emergency ends, a predetermined event indicating the end of the emergency may be initiated by a designated communication unit or a console operator. Upon receiving the end of emergency indication, the communication resource allocator (102) deactivates the call patch. As mentioned above, the automatic execution of system reconfigurations does not substantially interfere with supervisory functions that a console operator may be performing.

If, prior to the end of the emergency for communication resource #1, another emergency call is initiated on communication resource #n, the communication resource allocator (102) responds to both emergency calls based on a predetermined execution priority level. As shown in table 1, when a call patch requirement is initiated in communication resource #n, communication resources #2, #3, and #n are to be patched together by OMI #n. However, because the call patch initiated in communication resource #1 is still active, the call patch for communication resource #n cannot be fully executed without overlapping the call patch of communication resource #1. Under such circumstances, priority is given to the communication resource that initiated the call patch and to the first emergency initiated. Thus, for the present example, the communication resource allocator (102) would deactivate communication resource #n from the call patch initiated by communication resource #1, but not communication resource #2, and create a new call patch between communication resource #3 and #n for the emergency call initiated in communication resource #n.

With both emergencies active, two call patches are present, one between communication resources #1 and #2 and another between communication resources #3 and #n. When one emergency ends while the other is still active, the full call patch for the remaining emergency will be executed. Thus, if the emergency on communication resource #1 ends while the emergency on communication resource #n is still active, communication resource #2 will be patched into the existing patch such that communication resources #2, #3, and #n are patched together. The predetermined execution priority applies to execution of all overlapping system reconfigurations, where execution priority is determined by the user of the communication system.

As a further example, assume that console #2 of the plurality of consoles (101) is monitoring communication resource #2 but not communication resource #3. In a prior art communication system, when an emergency call that required a call patch was initiated in communication resource #2, the operator was required to assign communication resource #3 before a call patch could be established. With the present invention, when an emergency call that requires a call patch is initiated in communication resource #2, the communication resource allocator (102), via the system reconfiguration database in OMI #2, automatically patches communication resources #2 and #3 together. The automatic call patch takes place without the operator having to assign communication resource #3. (Where for console #2, communication resource #3 is an unpresented communication resource. Unpresented communication resources are described in co-pending application having the same filing date as this application entitled A Method and Apparatus for Utilizing Unpresented Communication Groups.)

Figure 3:
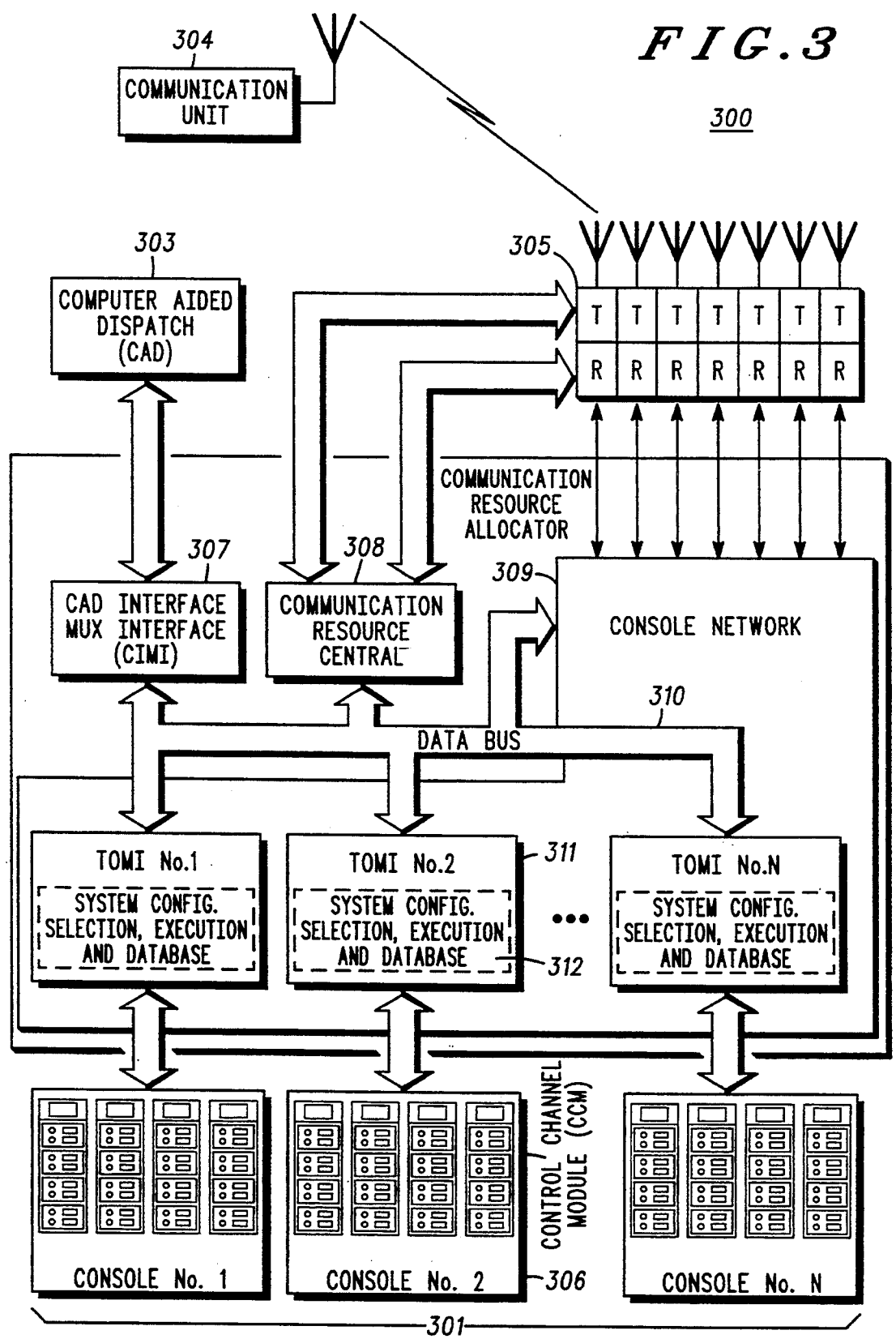
FIG. 3 illustrates a trunked communication system that incorporates the present invention.

FIG. 3 illustrates a trunked communication system (300) that includes a computer aided dispatch, (CAD) (303) or a console management terminal (CMT), and incorporates the present invention. The trunked communication system (300) comprises a plurality of consoles (301) (three shown), a communication resource allocator (302), a plurality of repeaters that transceive information on a plurality of communication resources (305) (seven shown), and a plurality of communication units (304) (one shown). Each of the plurality of consoles (306) comprises a plurality of control channel modules (CCM) (306) where each CCM monitors a group or subgroup of communication units. The communication resource allocator (302) comprises a CAD interface MUX interface (CIMI), (307) a communication resource central controller (308), a console network (309), and a data bus (310). The console network (309) further comprises a plurality of trunking operator MUX interfaces (TOMI) (311). Each TOMI (311) comprises an electronically reprogrammable memory device (312) for containing system reconfiguration databases, execution instructions, predetermined event receiving instructions, and selection information. The electronically reprogrammable memory device may be an electronically erasable programmable read only memory device (EEPROM).

By storing the system reconfiguration database in a reprogrammable memory device, system reconfigurations for predetermined events may be changed whenever a reassignment condition occurs. A reassignment condition may be, for example, a shift change, weekend shift, or changes in functions of groups. The operator of the CAD may reassign the system reconfiguration for all predetermined events for all the groups and subgroups or for just one predetermined event for one group or subgroup. Thus, the operator of the CAD has substantial control over the configuration of the communication system and the execution of system reconfigurations.

The CAD (303) of FIG. 3 may also be incorporated into the conventional communication system of FIG. 1. Similarly, the CAD (303) may be deleted from the trunked communication system of FIG. 3. In any configuration, whether the system reconfigurations for predetermined events are reprogrammable or fixed, the present invention reduces system reconfiguration execution times and reduces the possibility for human errors.

What is claimed is:

1. In a communication system having a plurality of repeaters that transceive information on a plurality of communication resources, a plurality of communication units, a communication resource allocator that allocates the plurality of communication resources among the plurality of communication units, and at least one console, wherein the plurality of communication units are arranged in communication groups, a method for automatically patching together communication groups, the method comprises the steps of:

a) initiating, by a communication unit of a particular communication group, a predetermined event of a plurality of predetermined events;

b) upon receiving the predetermined event from the unit, selecting, by the communication resource allocator, a predetermined communication system reconfiguration based on the predetermined event, wherein the predetermined communication system reconfiguration patches at least two communication groups together; and c) automatically executing, by the communication resource allocator, the predetermined communication system reconfiguration without intervention from an operator of the at least one console.

2. The method of claim 1 wherein step (c) further comprises executing the at least one selected reconfiguration, automatically, by affiliating predetermined communication groups with a dedicated emergency communication resource.

3. The method of claim 1 further comprises the steps of
- d) while the predetermined event is active, receiving, by the communication resource allocator, a second predetermined event from a communication unit of a second communication group;
- e) determining, by the communication resource allocator, a second predetermined communication system reconfiguration based on the second predetermined event, wherein the second predetermined communication system reconfiguration patches at least two communication groups together; and
- f) automatically executing, by the communication resource allocator, the second predetermined communication system reconfiguration based on a predetermined execution priority.

4. In the method of claim 3, the predetermined execution priority comprises the steps of:
 1) comparing, by the communication resource allocator, the at least two communication groups patched together via the predetermined communication system reconfiguration with the at least two communication groups patched together via the second predetermined communication system reconfiguration;
 2) when at least one communication group of the at least two communication groups patched together via the predetermined communication system reconfiguration is a communication group of the at least two communication groups patched together via the second predetermined communication system reconfiguration, determining, by the communication resource allocator, whether the at least one communication group contains the communication unit that initiated the second predetermined event; and
 3) when the at least one communication group contains the communication unit that initiated the second predetermined events associating the at least one communication group with the second predetermined communication system reconfiguration.

* * * * *